US007283538B2

United States Patent
Pham et al.

(10) Patent No.: US 7,283,538 B2
(45) Date of Patent: Oct. 16, 2007

(54) LOAD BALANCED SCALABLE NETWORK GATEWAY PROCESSOR ARCHITECTURE

(75) Inventors: Duc Pham, Cupertino, CA (US); Nam Pham, San Jose, CA (US); Tien Le Nguyen, Cupertino, CA (US)

(73) Assignee: Vormetric, Inc., Santa Clara, CA (US)

( * ) Notice: Subject to any disclaimer, the term of this patent is extended or adjusted under 35 U.S.C. 154(b) by 840 days.

(21) Appl. No.: 09/976,229

(22) Filed: Oct. 12, 2001

(65) Prior Publication Data
US 2003/0074388 A1    Apr. 17, 2003

(51) Int. Cl.
*H04L 12/56* (2006.01)
(52) U.S. Cl. .................. 370/401; 370/392; 370/396
(58) Field of Classification Search ................ 370/389, 370/392, 396, 400, 401
See application file for complete search history.

(56) References Cited

U.S. PATENT DOCUMENTS

| | | | |
|---|---|---|---|
| 5,453,979 A | 9/1995 | Schibler et al. | |
| 5,566,170 A | 10/1996 | Bakke et al. | |
| 5,754,791 A | 5/1998 | Dahlgren et al. | |
| 5,850,395 A | 12/1998 | Hauser et al. | |
| 5,850,446 A | 12/1998 | Berger et al. | |
| 5,872,783 A | 2/1999 | Chin | |
| 5,905,725 A | 5/1999 | Sindhu et al. | |
| 5,918,074 A | 6/1999 | Wright et al. | |
| 5,931,914 A | 8/1999 | Chiu | |
| 5,931,947 A | 8/1999 | Burns et al. | |
| 5,974,463 A | 10/1999 | Warrier et al. | |
| 6,005,874 A * | 12/1999 | Sharpe .................... | 370/524 |
| 6,078,943 A | 6/2000 | Yu | |
| 6,091,720 A | 7/2000 | Bedard et al. | |
| 6,157,649 A | 12/2000 | Peirce et al. | |
| 6,157,955 A | 12/2000 | Nerad et al. | |
| 6,160,819 A | 12/2000 | Partridge et al. | |
| 6,252,878 B1 | 6/2001 | Locklear, Jr. et al. | |
| 6,253,193 B1 | 6/2001 | Ginter et al. | |

(Continued)

OTHER PUBLICATIONS

IBM, IBM Network Processor (IBM32NPR161EPXCAC133) Product Overview, Published Oct. 4, 1999.

(Continued)

*Primary Examiner*—Wing Chan
*Assistant Examiner*—Nguyen Ngo
(74) *Attorney, Agent, or Firm*—NewTechLaw; Gerald B. Rosenberg, Esq.

(57) ABSTRACT

A network gateway processor architecture including a scalable array of compute processors that function to convert inbound data packets to outbound data packets, an ingress processor coupleable to a first network to receive the inbound data packets and coupled to provide the inbound data packets to the compute processors, and an egress processor coupleable to a second network and coupled to the compute processors to collect and forward the outbound data packets to the second network. The ingress processor distributes inbound data packets to the compute processors based on a least load value selected from current load values determined for the respective compute processors of the scalable array. The current load values represent estimated processing completion times for the respective compute processors of the scalable array of compute processors. Preferably, the current load values are dynamically derived with respect to the size of the inbound data packets and the performance of the respective compute processors.

11 Claims, 9 Drawing Sheets

U.S. PATENT DOCUMENTS

| | | | |
|---|---|---|---|
| 6,259,699 B1 | 7/2001 | Opalka et al. | |
| 6,260,155 B1 | 7/2001 | Dellacona | |
| 6,263,445 B1 | 7/2001 | Blumenau | |
| 6,266,705 B1 | 7/2001 | Ullum et al. | |
| 6,292,827 B1 | 9/2001 | Raz | |
| 6,351,775 B1 | 2/2002 | Yu | |
| 6,704,873 B1* | 3/2004 | Underwood | 713/201 |
| 6,876,657 B1* | 4/2005 | Brewer et al. | 370/394 |
| 2002/0152374 A1* | 10/2002 | Mayfield | 713/153 |
| 2002/0184487 A1 | 12/2002 | Badamo et al. | |
| 2003/0012147 A1* | 1/2003 | Buckman et al. | 370/260 |
| 2003/0126200 A1* | 7/2003 | Wolff | 709/203 |
| 2003/0184799 A1* | 10/2003 | Ferlitsch | 358/1.15 |
| 2003/0202536 A1* | 10/2003 | Foster et al. | 370/469 |
| 2006/0029104 A1* | 2/2006 | Jungck | 370/498 |
| 2006/0050690 A1* | 3/2006 | Epps et al. | 370/359 |

OTHER PUBLICATIONS

BROADCOM, BCM5820 E-Commerce Product Brief, 5820-PB00-R-3.26.01, Published 2001.

BROADCOM, BCM5840 Gigabit Security Processor Product Brief, 5840-PB00-R-12.6.00, Published 2000.

IBM, The Network Processor—Enabling Technology for High-Performance Networking, Published Aug. 1999.

IBM, Packet Routing Switch PRS28G, Version 1.7 Datasheet, prs28.04.fm, Feb. 6, 2001.

IBM, IBM PowerNP™ NP4GS3 Network Processor Preliminary Datasheet, May 18, 2001.

IBM, Product Overview, IBM PowerNP NP4GS3, Network Processor Solutions, Apr. 16, 2001.

Alan Radding, Storage ROI: Truth & Fiction, Infoworld Custom Meda Group, 2001.

IETF, IP Storage Working Group, iSCSI Requirements and Design Considerations, Document: draft-ietf-ips-iscsi-reqmts-05.txt, Jul. 2001.

IETF, IP Security Working Group, Security Properties of the IPsec Protocol Suite, Document draft-krywaniuk-ipsec-properties-00.txt, Jul. 9, 2001.

IETF, iSCSI, Document draft-ietf-ips-iscsi-08.txt, Sep. 30, 2001.

* cited by examiner

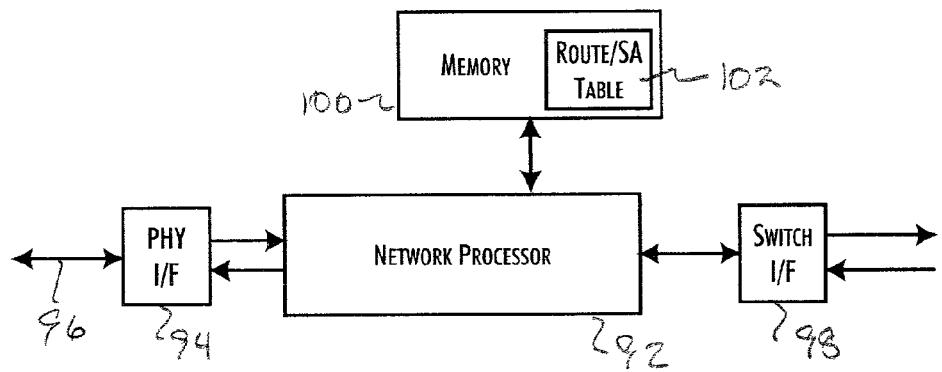
FIG. 5
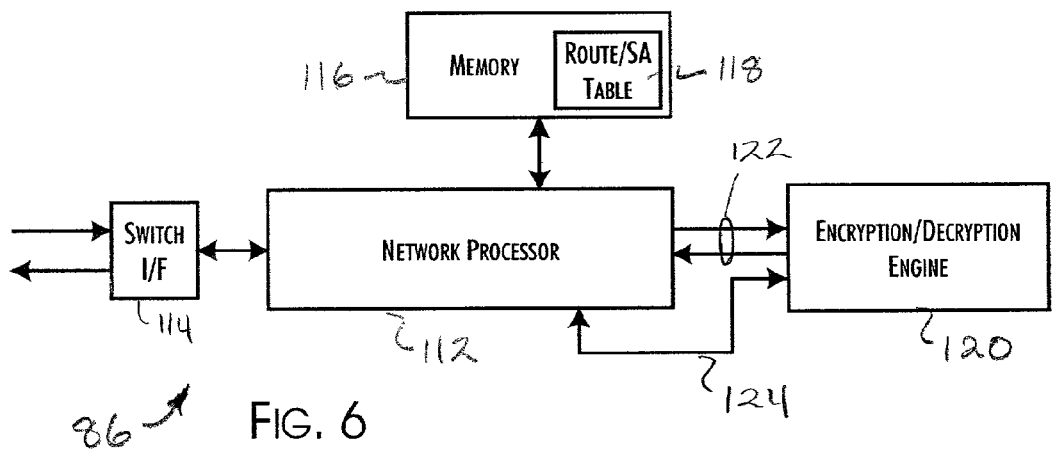
FIG. 6
FIG. 11
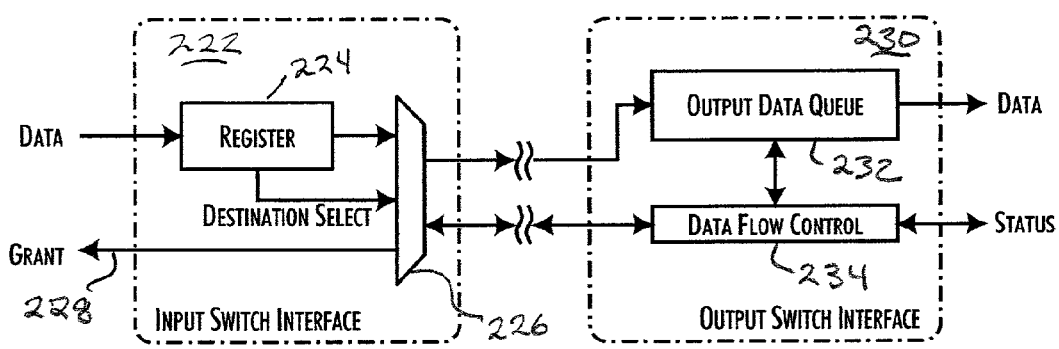

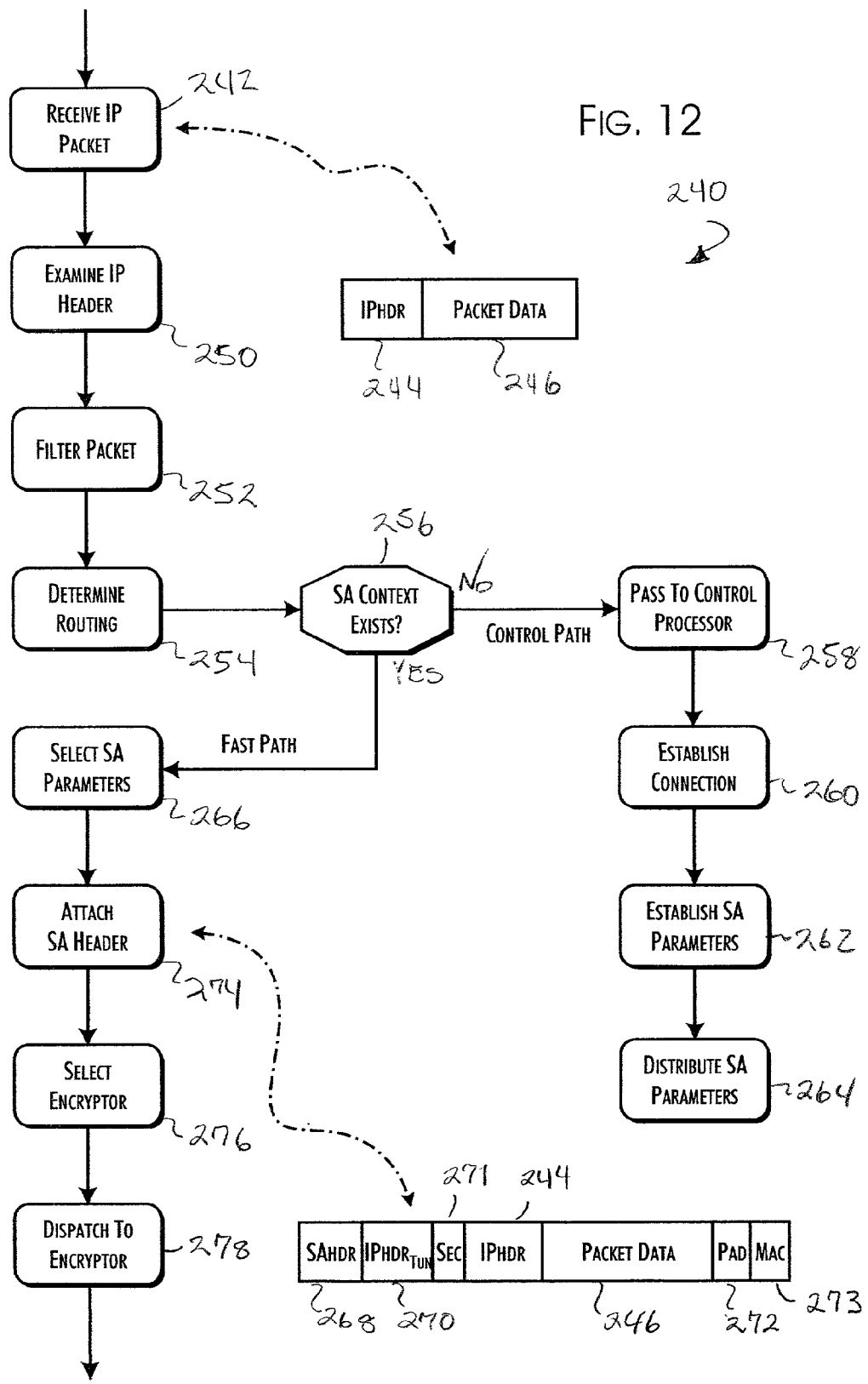

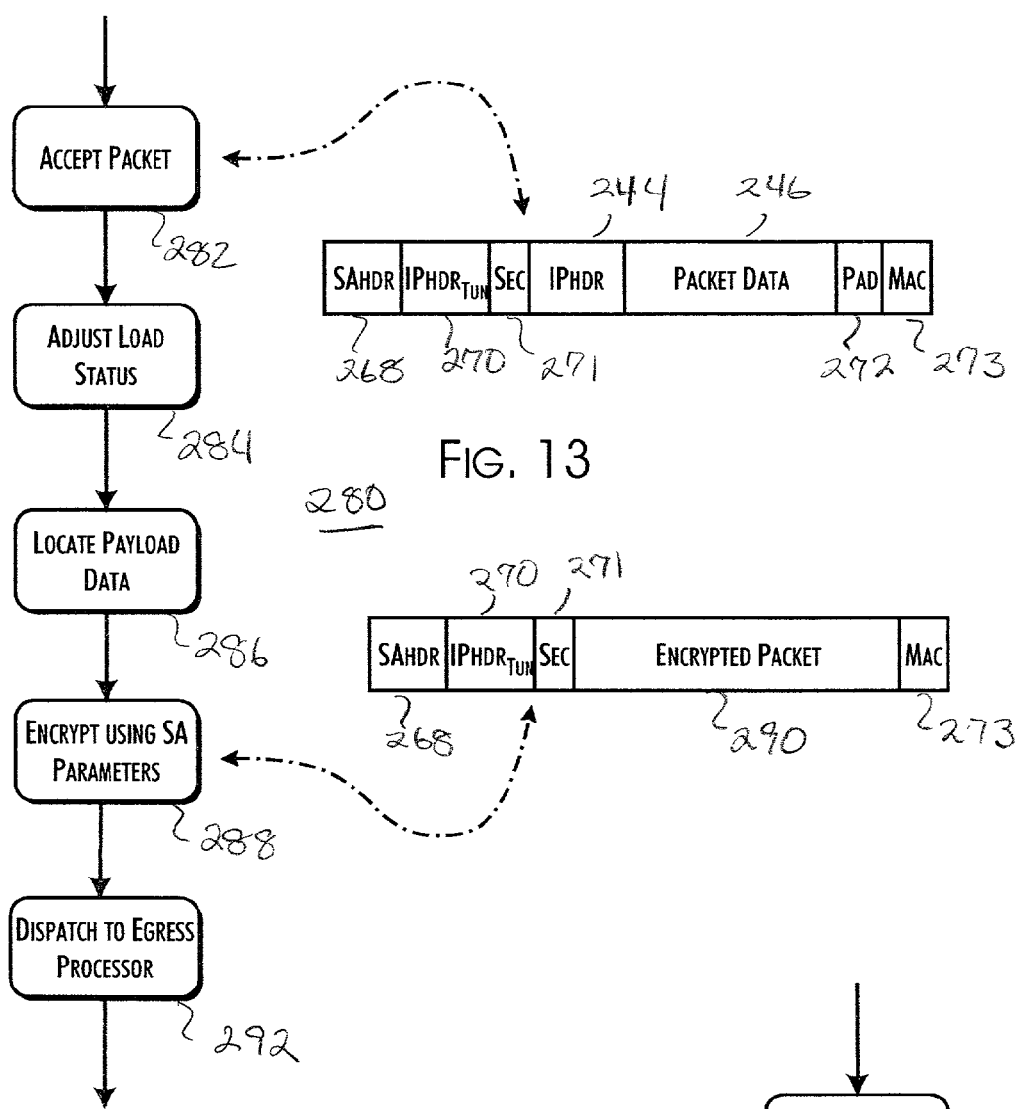
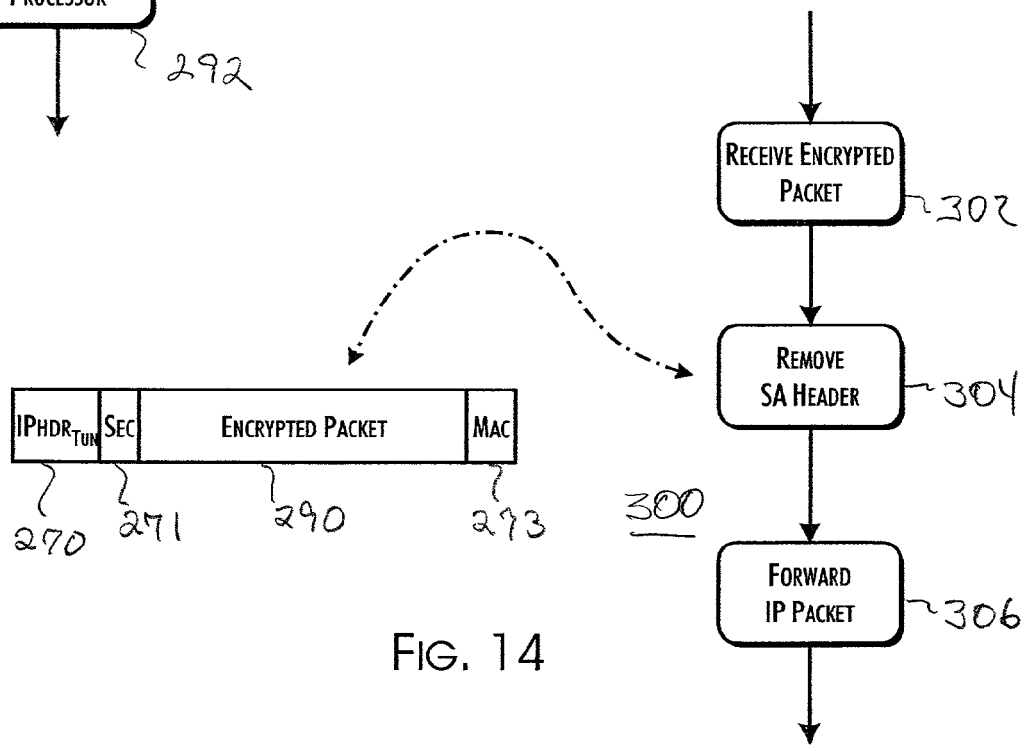
FIG. 13
FIG. 14

LOAD BALANCED SCALABLE NETWORK GATEWAY PROCESSOR ARCHITECTURE

CROSS-REFERENCE TO RELATED APPLICATIONS

The present application is related to the concurrently filed application entitled SCALABLE NETWORK GATEWAY PROCESSOR ARCHITECTURE, by Pham et al. and assigned to the Assignee of the present Application.

BACKGROUND OF THE INVENTION

1. Field of the Invention

The present invention is generally related to computer network infrastructure components, such as network gateways, that implement scalable high-speed architectures, and, in particular, to a scalable network gateway processor optimally implementing wire-speed compute intensive processing operations on network data packets that uses an efficient internal load balancing system.

2. Description of the Related Art

With the continued growth of the Internet and proliferation of private distributed intranets, increasing the speed, security, and transactional reliability of network data transmissions remains a fundamental concern and continuing consideration in the development of new network infrastructure. The demands on the growth of the Internet, particularly in terms of speed, have been even more dramatic. Network speed requirements even several tiers from the Internet backbone are rapidly exceeding one gigabit per second (Gbps) and likely to jump to four, ten Gbps, and even greater speeds in the very near future. Very high-speed infrastructure components are therefore widely needed in the broad construction of the Internet and connected private distributed intranets.

Much of this demand for increased network speed, security, and reliability is driven by the very real efficiencies that can be obtained by extending complex services and capabilities to remote network locations and between private distributed intranets. In most cases, maximizing these efficiencies requires that the network infrastructure connect remote locations and private distributed intranets at wire speed—the maximum fundamental speed of the network connecting any two sites. Network traffic switches and routers are conventionally designed to operate at wire-speeds. There are, however, many network functions that, as conventionally implemented, operate at only a fraction of current third tier wire-speeds. Network components implementing these functions therefore necessarily impose significant bottlenecks in the network traffic between remote locations and distributed private intranets.

Network components conventionally recognized as creating bandwidth limitations are characteristically required to perform compute intensive operations. In essence, such network components must limit the rate of new data packets being received in order not to overwhelm the buffering capacity of the network component while the compute intensive function is being performed. Even with substantial buffering, the inability to timely process received data packets results in an overall bandwidth limitation that reduces throughput to a small fraction of the wire-speed of the connected infrastructure. The provision of such buffering, however, also raises problems ensuring security over the buffered data and transactional reliability through the buffer.

Examples of compute intensive network components include virtual private network (VPN) and secure sockets layer (SSL) components and components providing packet protocol conversions, such as between fiber channel and iSCSI protocols. Conventional VPN components are used to establish secure virtual private connections over the public Internet between distributed locations. Security for such VPN network transmissions over the Internet is typically implemented using secure internet protocols, such as the IETF established IPsec protocols. The in-band encryption protocols of IPsec provide for the encryption of Internet routed packet data, enabling point-to-point secure delivery of Ethernet transported data. In many circumstances, such as typified by corporate intranet environments, local network traffic requirements may easily aggregate to levels requiring gigabit Ethernet VPN connections between distributed locations. While software-only solutions are possible, isolation of the compute intensive data encryption and decryption services of IPsec on a hardware-based accelerator is conventionally recognized as necessary to support bandwidths that are any significant fraction of a gigabit Ethernet connection.

The SSL protocol similarly involves in-band encryption and decryption of significant volumes of network traffic. Although the SSL protocol is implemented as a presentation level service, which allows applications to selectively use the protocol, Internet sites typically concentrate SSL connections in order to manage repeated transactions between specific clients and servers to effect the appearance of a state-full connection. As a result, network traffic loads can easily aggregate again to substantial fractions of a gigabit Ethernet connection. SSL accelerator network components are therefore needed to implement hardware-based encryption and decryption services, as well as related management functions, where the network traffic is any significant fraction of a gigabit Ethernet connection.

Unfortunately, conventional network components capable of any significant in-band compute intensive processing of high-throughput rate packet data are incapable of achieving gigabit wire-speed performance. Typically, a peripheral accelerator architecture, such as described in U.S. Pat. No. 6,157,955, is utilized to perform the compute-intensive functions. Such architectures generally rely on a bus-connected peripheral array of dedicated protocol processors to receive, perform the in-band data processing, and retransmit data packets. Each protocol processor includes a hardware encryptor/decryptor unit, local ingress and egress Ethernet interfaces and a bridging interface, operable through the peripheral bus. Conventionally, each peripheral protocol processor may be capable of performing on the order of 100 megabits of total throughput. The bridging interface is therefore necessary to aggregate the function of the peripheral array. Thus, while significant peak accelerations can be achieved for data packets both received and retransmitted through the local Ethernet interfaces of a single protocol processor, the aggregate array performance is actually limited by the performance of the shared peripheral bus interconnecting the array. High-speed peripheral interconnect buses, such as the conventional PCI bus, are limited to a theoretical maximum throughput of about 4 Gbps. With the necessary effects of bus contention and management overhead, and multiple bus transactions to transport a single data packet, the actual bridged data transfer of even just four peripheral processors can effectively saturate the peripheral bus. Consequently, the aggregate throughput of such peripheral arrays conventionally fall well below one Gbps and run more typically in the range of 250 to 400 Mbps. Such rates clearly fail to qualify as wire-speed in current network infrastructures.

Consequently, there is a need for an efficiently scalable system and architecture capable of performing compute intensive data packet processing at wire-speeds in excess of one Gbps and readily extendable to speeds of 4 and 10 Gbps and beyond.

SUMMARY OF THE INVENTION

Thus, a general purpose of the present invention is to provide an efficiently scalable network gateway component capable of performing compute intensive data packet processing at wire-speeds.

This is achieved in the present invention by a network gateway processor architecture that includes a scalable array of compute processors that function to convert inbound data packets to outbound data packets, an ingress processor coupleable to a first network to receive the inbound data packets and coupled to provide the inbound data packets to the compute processors, and an egress processor coupleable to a second network and coupled to the compute processors to collect and forward the outbound data packets to the second network. The ingress processor distributes inbound data packets to the compute processors based on a least load value selected from current load values determined for the respective compute processors of the scalable array. The current load values represent estimated processing completion times for the respective compute processors of the scalable array of compute processors. Preferably, the current load values are dynamically derived with respect to the size of the inbound data packets and the performance of the respective compute processors.

Thus, an advantage of the present invention is that computation-intensive protocol processing functions can be effectively distributed over a scalable array of data processing engines configured for the specific data processing function desired. The network connection processors manage a dynamically load balanced transfer of data to and through the data processing engines by way of a high-speed switch fabric, thereby efficiently aggregating the available bandwidth of the data processing engines. Consequently, the network data processor system of the present invention is capable of operating at or above gigabit wire-speeds utilizing only a small array of network data processors and, further, readily scaling to multiple gigabit throughput levels by, at a minimum, merely expanding the array of network data processors.

Another advantage of the present invention is that the network data processor system is capable of operating as a comprehensive and centrally manageable protocol processing network gateway. All network traffic that is to be processed can be routed to and through the network gateway. The included network control processor functions to control the setup of the network data processor system and establish, as needed, external network data connections through the network processor system. Thus, internal and network connection management functions necessary to support high-speed data transfers through the network data processor system are segregated to the control processor, allowing the compute-intensive network data processing operations to be isolated on the network data processors.

A further advantage of the present invention is that the distribution of data through the data switch fabric allows the network data processor system to establish a logical, high-performance data path that is load-balanced across and through the available array of network data processors. The limitation on total data packet processing throughput is therefore effectively the aggregate processing bandwidth of the available array of network data processors.

Still another advantage of the present invention is that the network data processors can be flexibly configured to implement any of a number of different network protocol processing functions including particularly those that are compute intensive. Where, as in the preferred embodiments of the present invention, the protocol processing is IPsec-type encryption and decryption, the network data processors can directly implement hardware encryption and decryption engines tailored to the specific forms of crypto-algorithms needed for the intended protocol processing.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 5 provides a block diagram of an ingress/egress network processor module constructed in accordance with a preferred embodiment of the present invention;

FIG. 6 provides a block diagram of a network packet processor module constructed in accordance with a preferred embodiment of the present invention;

FIG. 11 provides a detailed block diagram illustrating the input and output port controls of a switch fabric utilized in a preferred embodiment of the present invention;

FIG. 12 is a control flow diagram describing the data processing of an input clear text network data packet by an ingress processor module in accordance with a preferred embodiment of the present invention;

FIG. 13 is a control flow diagram describing the data processing of a clear text network data packet by an encrypting network packet processor module in accordance with a preferred embodiment of the present invention;

FIG. 14 is a control flow diagram describing the data processing of an encrypted network data packet by an egress processor module in accordance with a preferred embodiment of the present invention;

DETAILED DESCRIPTION OF THE INVENTION

Network infrastructure devices are required to perform a variety of operations to maintain the smooth flow of network traffic through the Internet and private intranets. Basic operations, such as performed by network data packet switches, can easily be performed at wire-speed, here defined as the maximum bandwidth of the directly connected network. More complex operations, such as the routing and filtering of network data packets, present a substantial challenge to accomplish at wire-speeds. While conventional routers routinely operate at wire-speeds, protocol processing operations that are more compute intensive, typically involving data conversions and translations, cannot conventionally be achieved at significant wire-speeds, ranging from about one Gbps and higher, but rather are bandwidth limited typically to below 400 Mbps. The present invention, however, provides a system and methods for performing compute-intensive protocol processing operations with a total throughput readily matching the wire-speed of the attached network at speeds of about one Gbps and higher.

Figure 1:
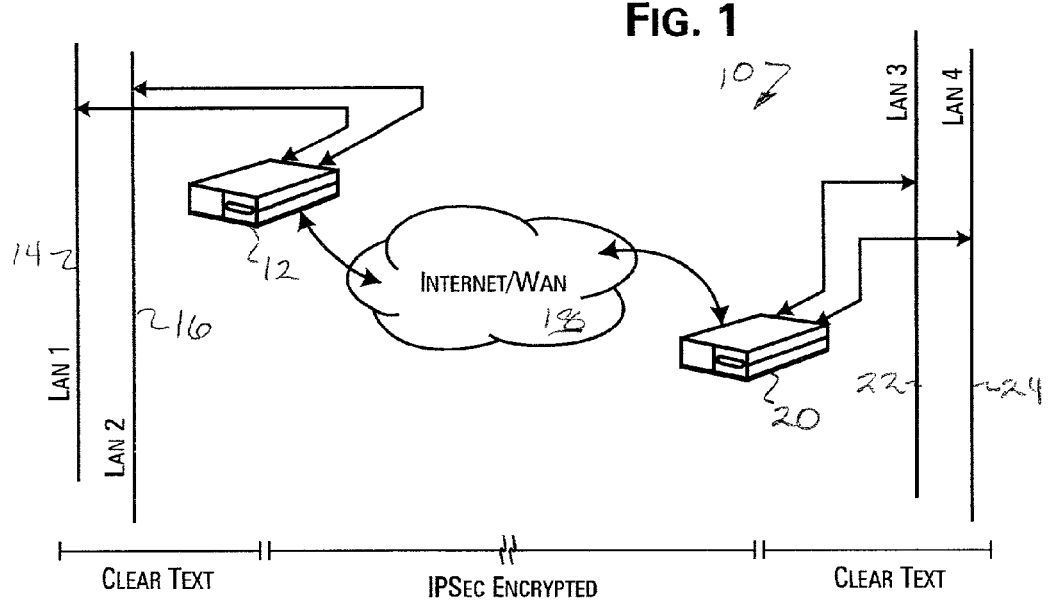
FIG. 1 is an illustration of networking environment utilizing network gateway switches in accordance with a preferred embodiment of the present invention.

An exemplary virtual private network (VPN) application 10 of the present invention is generally shown in FIG. 1. A VPN gateway 12, constructed and operating in accordance with a preferred embodiment of the present invention, connects data packet traffic from one or more local area networks (LANs) 14, 16 through the public Internet 18. A second VPN gateway 20, also constructed and operating in accordance with a preferred embodiment of the present invention, connects data packet traffic between the Internet 18 and other LANs 22, 24. The VPN gateways 12, 20 operate to convert data conveyed by the data packets transferred through the gateways 12, 20 between clear and encrypted text, preferably consistent with the in-band encryption protocols of the IPsec standard. By implementing the IPsec tunneling mode protocols, the presence and operation of the VPN gateways 12, 20 is transparent to other network infrastructure devices within the infrastructure of the Internet 18 interconnecting the gateways 12, 20.

Figure 2:
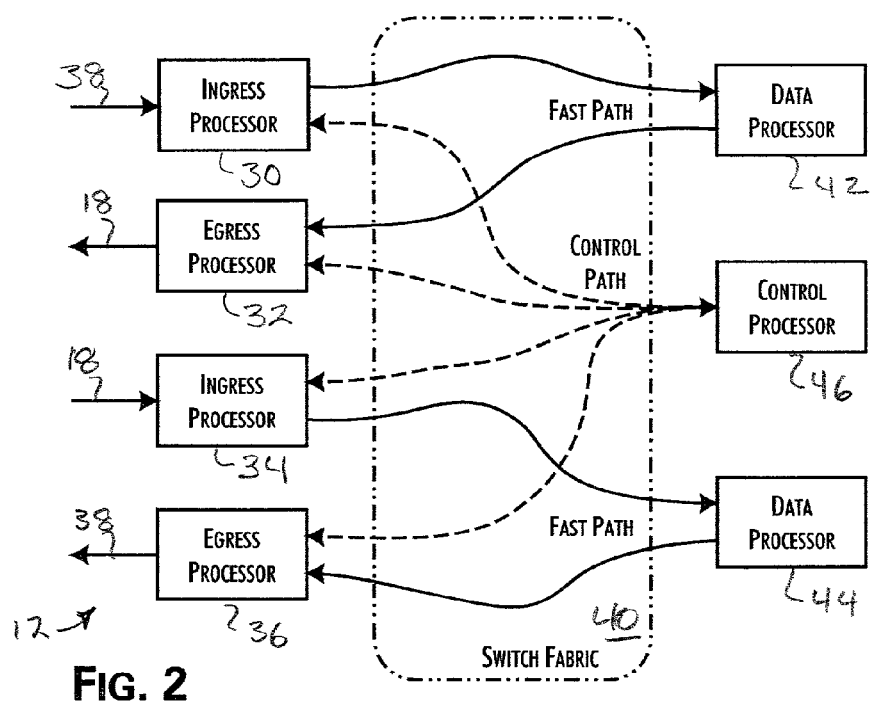
FIG. 2 is a simplified block diagram illustrating multiple switched packet data paths implemented in a preferred embodiment of the present invention.

The data flow architecture of the VPN gateway 12, and generally the architecture of the preferred embodiments of the present invention, is shown in FIG. 2. The system architecture includes network ingress and egress processors 30, 32, 34, 36 providing a bidirectional connection between a local LAN 38 and a wide area network (WAN), such as the Internet 18. These ingress and egress processors 30, 32, 34, 36 are interconnect through a switch fabric 40 to data packet processors 42, 44, each representing an array of such processors, and a control processor 46. In the preferred embodiments of the present invention, the ingress processors 30, 34 are tasked with filtering and routing functions for network data packets received on their network connections to the LAN 38 and Internet 18. The routing function includes internally directing individual data packets through a fast processing path to the arrays of data packet processors 42, 44 or through a control processing path to the control processor 46.

The control path route is selected for data packets recognized as being directed to the VPN gateway 12 itself. Such data packets likely represent control commands used to configure and manage the VPN gateway 12. The control path is also selected for network data packets recognized by an ingress processor 30, 34 as representing or initiating a new logical network connection through the VPN gateway 12. Depending on the particular protocol processing responsibilities of the data packet processors 42, 44, the establishment of new network connections may require a network interaction with the remote gateway 20 to establish mutually defined protocol parameters. In the case of the IPsec protocol, a network exchange is required to mutually establish various secure authority (SA) parameters for the encryption and decryption of data. The IPsec and related protocols are described in RFC2401, RFC2406 and subsequent RFCs that are publically available from the Internet RFC/STD/FYI/BCP Archives at www.faqs.org/rfcs. The control processor 46 is responsible for handling the IPsec protocol defined exchanges and internally managing the security authority parameters developed through the exchanges as necessary to persist the recognition of the finally established connection.

Fast path routing is selected for those network data packets that are recognized by the ingress processors 30, 34 as belonging to a previously established network connection. In the preferred embodiments of the present invention, the further choice of fast path routing of data packets is determined by the type of data packet processing required, such as data encryption or decryption, and the relative availability of the data packet processors 42, 44 to receive and process data packets. In particular, packets not requiring processing through the data packet processors 42, 44 are bypassed between the ingress and egress processors 30, 32, 34, 36.

For the preferred IPsec processing embodiments of the present invention, clear text data packets forwarded from the LAN 38 through the VPN gateway 12 subject to the VPN encryption protection are routed by the ingress processor 30 through the switch fabric 40 to an available encryption data packet processor 42. The encrypted data packet is then returned through the switch fabric 40 to the egress processor 32 and passed onto the Internet 18. Conversely, encrypted data packets received from the Internet 18 are routed by the ingress processor 34 through the switch fabric 40 to a decryption data packet processor 44. The resulting clear text data packet is then passed to the egress processor 36 for transferred onto the LAN 38. In the preferred embodiments of the present invention, a dynamic selection of data packet processors 42, 44 is performed for each received data packet based on availability of specific data packet processors to process data packets results in a per-packet load-balancing that efficiently maximizes the utilization of the data packet processors 42, 44.

Figure 3:
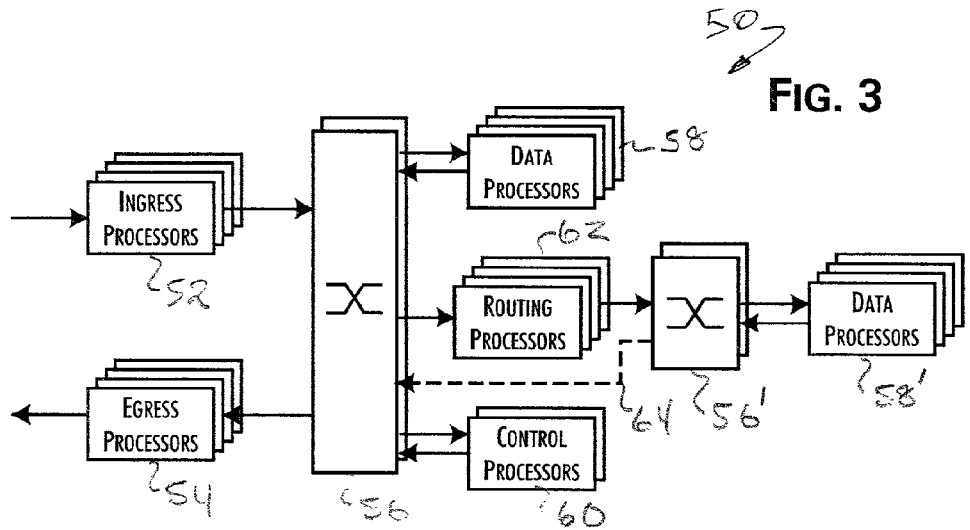
FIG. 3 is block diagram illustrating a generalized, multiple processing level embodiment of the present invention.

An extended protocol processor architecture 50 consistent with the present invention is shown in FIG. 3. Multiple ingress processors 52 and egress processors 54 can be provided as part of the architecture 50 to support aggregation of network data traffic from multiple LANs through a single gateway device. This also allows the ingress and egress processors 52, 54 to extend the functionality of the architecture 50 to include data compression, network data traffic switching and routing, and other compute intensive packet processing operations on a single gateway device implementing the architecture 50. Multiple switch fabrics 56 can also be incorporated into the architecture 50 to provide connection redundancy and increase the effective bandwidth of the switch fabric 56 through added connection parallelism. Multiple scalable arrays of data packet processors 58 can be directly connected to the switch fabrics 56 to provide various forms of protocol data processing, characterized as involving significant computation intensive operations. The individual data packet processors 58 may be configured to perform a single protocol conversion operation or, by selection, any of multiple related operations. For example, packet data can be compressed before encryption and decompressed following decryption. Single data processors 58 can be used to perform multiple compute intensive operations or the fast path processing of network data packets may be extended to include the transfer of data packets between multiple data packet processors 58 before finally being forwarded on to an egress processor 54. Thus, separate data compression/decompression and encryption/decryption data processors can be employed for reasons of architectural flexibility and simplicity. Multiple control processors 60 can also be included for both redundancy and increased capacity for handling control process flows and protocol negotiations.

A scalable array of routing processors 62 are provided to expand the high-speed protocol processing capabilities of the architecture 50. With substantially increasing wire-speed, the computational capabilities of the ingress processors 52 may become insufficient to timely perform all of the required filtering, routing and load-balancing functions. Thus, at wire-speeds in excess of about 20 Gbps, limiting the computational responsibilities of the ingress processors 52 to basic switching and filtering network data packets may be preferred. In such cases, the array of routing processors 62, preferably greater in number than the ingress processors 52, can operate to offload packet processing tasks from the ingress processors 52. The offloaded tasks can include the full routing function, including the association of SA parameters with network data packets, and dynamic load-balancing distribution of data packets to the available data packet processors 58. The routing processors can also be utilized to perform other in-band protocol management and data processing functions.

Network data packets processed by the routing processors 62 can be multiply routed through the switch fabric 56 to the data packet processors 58, shown as the switch fabric 56' and data packet processors 58'. Alternately, the switch fabric 56' may be separate from the switch fabric 56, thereby limiting the bandwidth demands on the switch fabric 56 caused by multiple transfers of individual data packets through a common fabric. The use of the separate switch fabric 56' also allows additional arrays of packet data processors 58' to be employed within the architecture 50, thereby increasing the supportable aggregate bandwidth. In either case, the data packet processors 58' return the processed data packets through the switch fabrics 58, 58' using a logical or physical path connection 64 to an appropriate egress processor 54.

Figure 4:
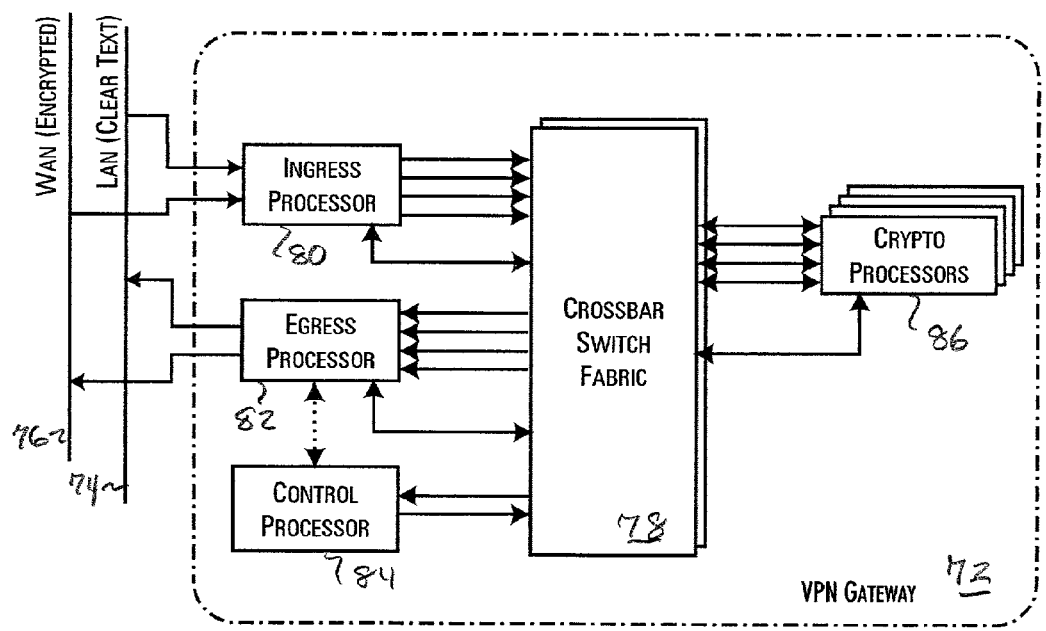
FIG. 4 provides a block diagram of the preferred embodiment of the network gateway packet processor of the present invention.

A preferred VPN embodiment 70 of the present invention, representing a specific implementation of the extended protocol processor architecture 50, is shown in FIG. 4. A VPN gateway 72 provides a single physical LAN 74 connection supporting multiple logical connections over a local clear text network and a single physical WAN 76 connection, extending encrypted network connections over the Internet. The VPN gateway 72 utilizes IBM Packet Routing Switches PRS28.4G (IBM Part Number IBM3221L0572), available from IBM Corporation, Armonk, N.Y., as the basis for a central crossbar switch fabric 78 interconnecting an ingress processor 80, an egress processor 82, a control processor 84 and an array of two to sixteen crypto processors 86. Pairs of the Packet Routing Switches are connected in a speed-expansion configuration to implement sixteen input and sixteen output ports and provide non-blocking, fixed-length data packet transfers at a rate in excesses of 3.5 Gbps for individual port connections, with an aggregate bandwidth in excess of 56 Gbps. For in-band network data transfers, each ingress processor 80 and egress processor 82 connects to the switch fabric 78 through multiple ports of the fabric 78 to establish parallel packet data transfer paths though the switch fabric 78 and, thus, to divide down, as necessary, the bandwidth rate of the connected networks 74, 76 to match the individual port connection bandwidth of the switch fabric. Thus, for 4 Gbps network 74, 76 connections, each ingress processor 80 implements at least three port connections to the switch fabric 78. Likewise, each egress processor 82 receives at least three output port connections to the switch fabric 78. For the preferred embodiment of the VPN gateway 72, which supports Gigabit Ethernet connections, each ingress and egress processor 80, 82 requires just a single port connection each to the switch fabric 78 to easily support the full bandwidth requirements of in-band network data traffic.

Each of the crypto processors 86 preferably implements a basic two port connection to the switch fabric 78. Due to the compute intensive function implemented by the crypto processors 86, the throughput capabilities of the crypto processors 86 are expected to be less if not substantially less than the bandwidth capabilities of a single switch fabric port connection. Thus, in the preferred embodiments of the present invention, each crypto processor 86 need only implement single input and output connections to the switch fabric 78.

Finally, the control processor 84 preferably also implements a bi-directional two port connection to the switch fabric 78. While additional ports might be utilized to support low latency and higher bandwidth operations, the network protocol handling requirements and system management functions performed by the control processor 84 are not anticipated to be limited by a single port connection. Preferably, the control processor 84 is implemented using a conventional embedded processor design and executes an embedded version of the Linux® network operating system with support for the IPsec protocol.

In a preferred embodiment of the present invention, the control processor 84 utilizes the port connections between the control processor 84 and switch fabric 78 to transmit effectively out-of-band control information and receive status information from the ingress, egress, and crypto processors 80, 82, 86. In-band communications with external network connected devices, such as for network protocol negotiations, is accomplished by utilizing the ingress and egress processors 80, 82 as simple network access ports. Both the in-band and out-of-band communications are performed through the existing ports connecting the ingress, egress, and crypto processors 80, 82, 86 to the switch fabric 78. Where there are few available ports on the switch fabric 78, or where simplicity of implementation is a factor, the control processor 84 may instead connect directly to an available auxiliary network communications port of an egress processor 82. The in-band and out-of-band control processor 84 communication are simply routed to and through the egress processor 84 as appropriate to the ingress and crypto processors 80, 86 as well as the networks 74, 76 utilizing the existing network and switch connections of the egress processor 82.

While the detailed function of the ingress and egress processors 80, 82 is somewhat different, the processors 80, 82 utilize substantially the same communications processor 90 implementation, as shown in FIG. 5. A high-performance network protocol processor 92 is used to implement the functions of the communications processor 90. In the preferred embodiment of the present invention, the network processor 92 is an IBM PowerNP NP4GS3 Network Processor (Part Number IBM32NPR161EPXCAE133), which is a programmable processor with hardware support for Layer 2 and 3 network packet processing, filtering and routing operations at effective throughputs of up to 4 Gbps. The network processor 92 supports a conventional bi-directional Layer 1 physical interface 94 to a network 96. A basic serial data switch interface 98 is included in the preferred Network Processor and provides two uni-directional data-aligned synchronous data links compatible with multiple port connections to the switch fabric 78. Preferably, the switch interface 98 can be expanded, as needed, through trunking to provide a greater number of speed-matched port connections to the switch fabric 78.

Finally, an array of high-speed memory 100 is provided to satisfy the external memory and program storage requirements of the network processor 92. Included within this memory 100 is a data table 102 providing a dynamic data store for accumulated routing and filtering information. For implementations of the ingress processor 80 utilized in preferred embodiments of the present invention, the data table 102 also stores network connection SA parameter data. The route and filtering data are accumulated in a conventional manner from inspection of the attached interfaces and the source addresses of data packets received through the interfaces. The SA parameter data is explicitly provided and, as appropriate, modified and deleted by the control processor 84 in response to the creation, maintenance, and dropping of IPsec connections that are routed through the VPN gateway 72. Preferably, the SA parameter data is used by the ingress processor 80 to dynamically create and attach SA headers to each received IPsec data packet. Thus, in accordance with the preferred embodiment of the present invention, each IPsec data packet transferred to a crypto processor 86 is packaged with all of the necessary SA information needed for IPsec protocol processing.

The preferred implementation of a crypto processor 86 is shown in FIG. 6. The network processor 112 is also preferably an NP4GS3 Network Processor, including a switch fabric interface 114. A memory array 116 is provided for the external memory and program requirements of the network processor. Optionally, in accordance with an alternate embodiment of the present invention, the memory array 116 also provides storage space for an SA parameter data table 118. In this alternate embodiment, the SA parameter association task is off-loaded from the ingress processors 80 and performed by the crypto processors 86. The control processor 84 explicitly propagates identical copies of the SA parameter data to each of the crypto processors 86, enabling the crypto processors 86 to process any data packet received.

The network processor 112 connects to and supports high-speed data interchange with a dedicated encryption/decryption engine 120 through a direct data transfer bus 122. The network processor 112 controls and monitors the engine 120 via control and status lines 124. Preferably, the engine 120 is a BCM5840 Gigabit Security Processor, available from Broadcom Corporation, Irvine, Calif. The BCM5840 processor implements a highly integrated symmetric cryptography engine providing hardware support for IPsec encryption and decryption operations. Utilizing the BCM5840, each crypto processor 86 is capable of a minimum sustained effective IPsec encryption/decryption and IPsec authentication rate of 2.4 Gbps.

In alternate embodiments of the present invention, the data table 118 can be used to store and share other information between the crypto processors 86 and, generically, data processors 58. In particular, a general purpose microprocessor can be substituted or provided in addition to the network processor 112 to support data compression and decompression operations. Compression symbols are identified dynamically by examination of the clear text data packets by the general purpose/network processor 112 and stored to the data table 118. The compression symbol sets are also dynamically shared by message transfer through the control processor 84 with all of the crypto/data processors 86 of both the local and any remote gateways 72. Any crypto/data processor 86 that subsequently receives a data packet for decompression therefore has access to the full complement of compression symbols in use, regardless of the particular crypto/data processor 86 that originally identified the symbol.

In the preferred embodiments of the present invention, the ingress processor 80 and crypto processors 86 cooperatively execute a load-balancing algorithm as the basis for determining the internal routing of received data packets from the ingress processor 80 to the crypto processors 86. The preferred load-balancing algorithm is optimized to account for the full processing path of data packets through the gateway 72. This includes accounting for differences in the performance capabilities of the crypto processors 86, as may result from parallel use of different types and revisions of the crypto processors 86, and multiple routing paths through the switch fabric 78, such as where a data packet repeatedly traverses the switch fabric 56 for precessing through multiple data processors 58. The preferred load-balancing algorithm of the present invention automatically accounts for these differences in order to obtain optimal performance from all available resources within the gateway 72 particularly under heavy loading conditions.

Figure 7:
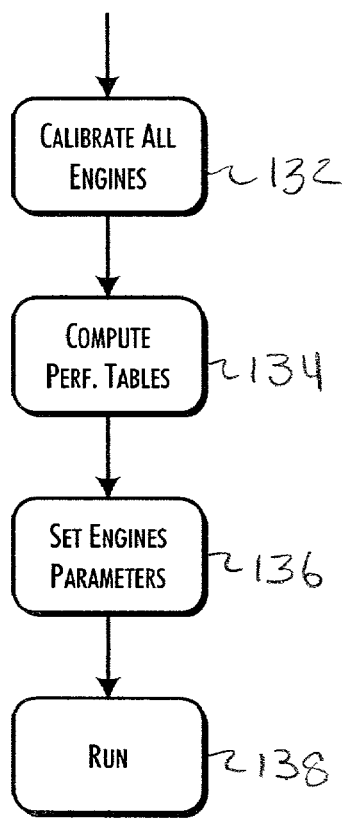
FIG. 7 is a control flow diagram showing the initialization of the load-balancing algorithm utilized in a preferred embodiment of the present invention.

The control processor 84 performs a load-balance initialization process 130, as shown in FIG. 7, on start-up. In the preferred embodiments of the present invention, the control processor 84 first calibrates 132 all of the crypto processors 86 by directing the ingress processor 80 to send time-stamped calibration vectors through each of the crypto processors 86. The calibration vectors are preferably discrete sequences of test data packets of varied length (64, 128, . . . , 1024, 2048, . . . bytes) and typical packet data symbol complexity. In alternate embodiments of the gateway 72 supporting multiple functions, vectors are also sent for the supported combinations of processing functions and switch fabric routes. Thus, where data compression is also supported, vectors for compression, decompression, encryption, decryption, and combined compression and encryption and decompression and decryption are sent.

The vector data packets are returned to the egress processor 82, which then reports the total transit time of the vector packets against the identity of the crypto processor 86 and the vector packet size to the control processor 84. Thus, actual round-trip transit times for a progression of packet sizes, correlated against individual crypto processors 86 are collected and recorded. Upon subsequent analysis of the recorded data, the control processor 84 creates performance tables 134 for each of the crypto processors 86. Where multiple data packet processors are involved in the processing of a data packet, the performance tables are instead generated on a processing route basis. These performance tables are then transferred to the ingress processor 80 for subsequent use as an accurate basis for generating calibrated estimates of the round-trip transit processing time for real, subsequently received data packets.

The control processor 84 can also use vector data packets to load the crypto processors 86 to force the occurrence of packet drops. By subsequently evaluating the combined number and size of vector packets pending processing by a crypto processor 86 before a loss occurs, the control processor 84 can determine the effective depth of the input FIFO implemented by each crypto processor 86. Upper and lower bounds for each crypto processor 86, representing a combined size and number of pending data packets, are then determined. The upper bound is preferably determined as the point where the combined size of pending data packets has effectively filled the input FIFO of a particular crypto processor 86. This effectively filled limit may be a point where an empirically selected size data packet cannot be further accommodated by the input FIFO. The lower bound may be simply determined as a fixed percentage of the FIFO depth, such as 10%, or a size dependent on the time necessary for the crypto processor 86 to process one typical data packet. These upper and lower bounds values, as determined by the control processor 84, are then dynamically programmed 136 into the respective crypto processors 86 for use by the cooperative portion of the load-balancing algorithm executed by the crypto processors 86. The ingress processor 80 is then enabled by the control processor 84 to run 138 a main data packet receipt event loop.

Figure 8:
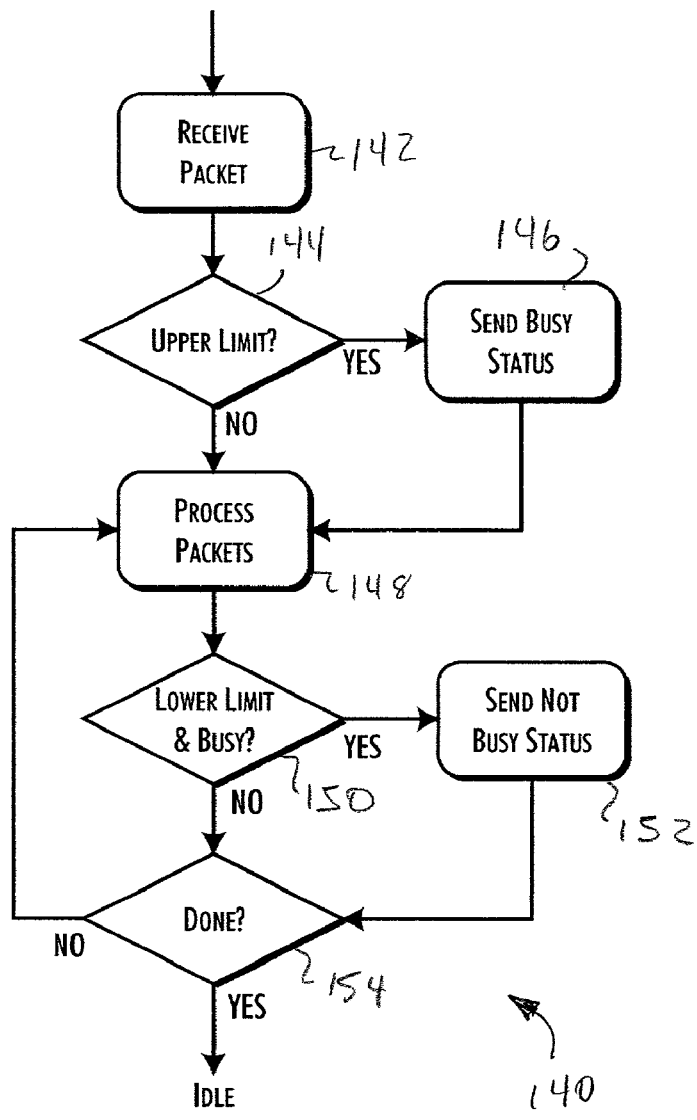
FIG. 8 is a control flow diagram showing the participatory operations of the data processor engines in implementing the load-balancing algorithm utilized in a preferred embodiment of the present invention.

The main portion 140 of the load-balancing algorithm executed by the crypto processors 86 is shown in FIG. 8. Whenever a data packet is received 142, the crypto processor 86 determines whether the threshold of the upper bound value has been reached 144. If the upper bound is reached, a busy status message is sent 146 from the crypto processor 86 to the ingress processor 80. In any event, the crypto processor 86 begins or continues to process 148 data packets from the crypto processor input FIFO. As each data packet is removed from the input FIFO, a comparison is performed against the lower bound value threshold. When the lower bound is first reached through the processing of pending data packets after a busy status message is sent, a not busy status message is sent 152 to the ingress processor 80. This operation serves to limit the number, and thus the overhead, of not busy status messages being sent to the ingress processor 80. An engine status monitoring portion of the load-balancing algorithm implemented by the ingress processor 80 automatically recovers from situations where a not busy message may be dropped by the ingress processor 80. While further packets remain 154 in the input FIFO, the crypto processor 86 continues processing 148 those packets. Otherwise, the crypto processor 86 idles waiting to receive a data packet. The receipt event loop is preferably asynchronous with respect to the processing of data packets 148.

Figure 9:
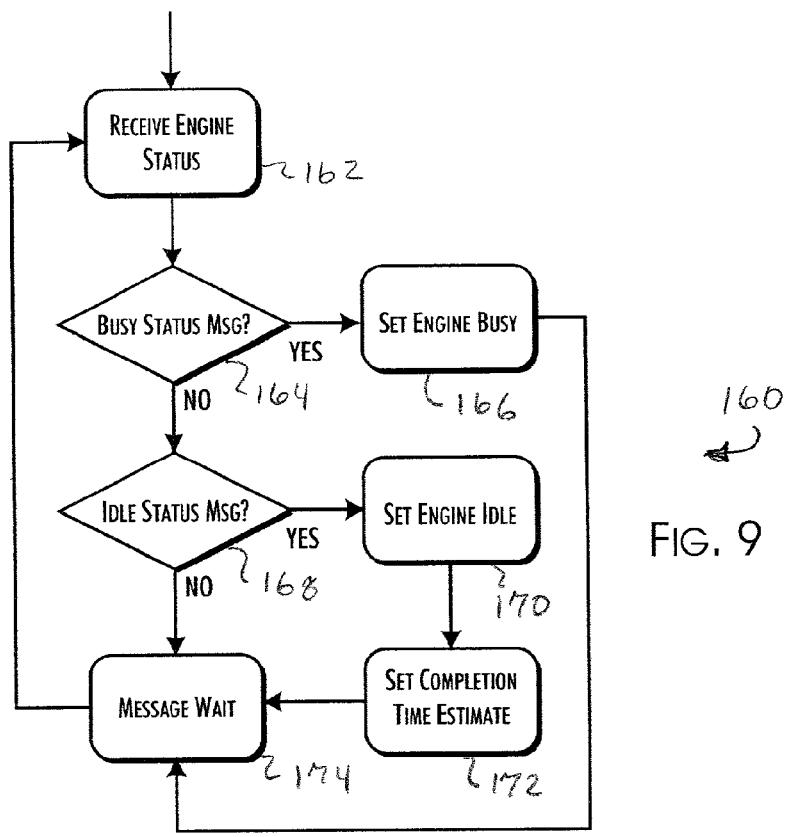
FIG. 9 is a control flow diagram showing the message monitoring operation of an ingress processor in implementing the load-balancing algorithm utilized in a preferred embodiment of the present invention.

An engine status monitoring loop 160, executed by the ingress processor 80 in connection with the main data packet receipt event loop 138, is shown in FIG. 9. Busy messages received 164 from the crypto processors 86 cause the ingress processor 80 to mark the corresponding crypto processor 86 as being busy 166 and records the time the message was received. Not busy messages 168 are handled by the ingress processor 80 as signaling that the crypto processor 86 is immediately available to accept new data packets for processing. The ingress processor 80 marks the crypto processor 86 as ready 170 and records the current time 172 as the current estimated time-to-complete value maintained for the crypto processor 86. The monitoring loop 160 then waits 174 for a next message from any of the crypto processors 86.

Figure 10:
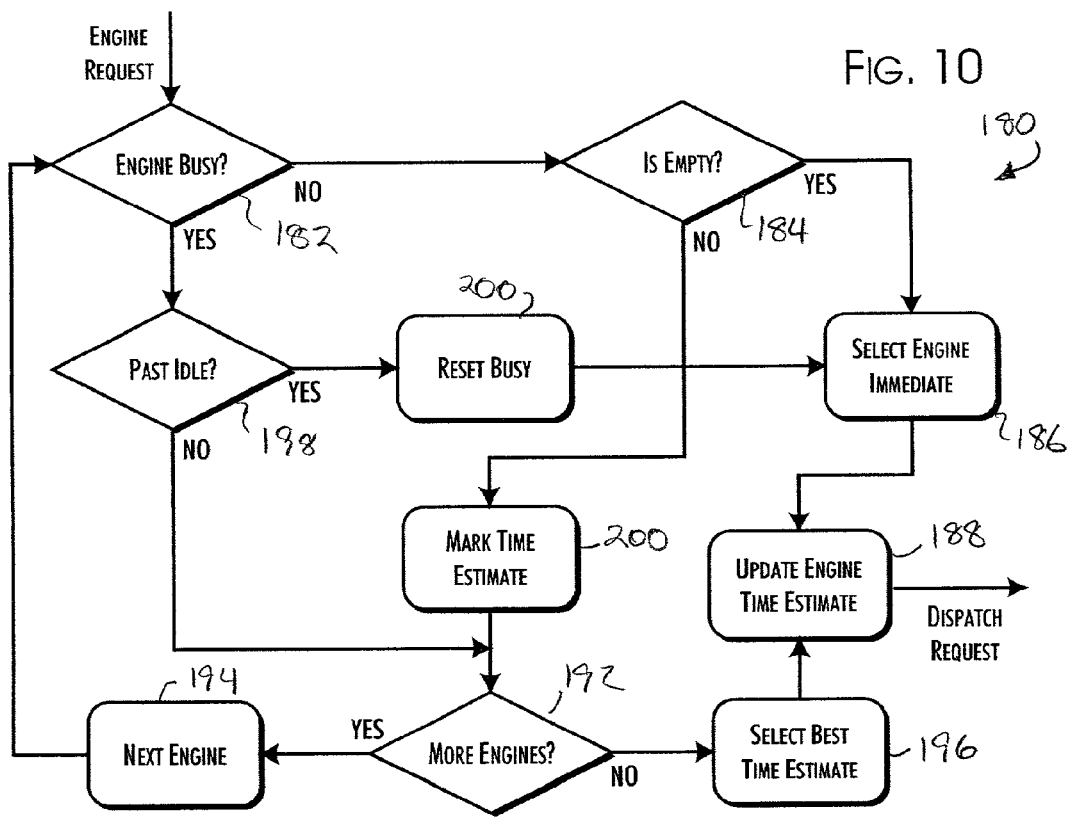
FIG. 10 is a control flow diagram detailing the load analysis and data processor selection and dispatch operation, as implemented by an ingress processor in response to the receipt of a data packet, in accordance with a preferred embodiment of the present invention.

A load-balancer request process 180, as shown in FIG. 10, is invoked on the ingress processor 80 whenever a received data packet is to be internally routed through an available crypto processor 86. For the preferred embodiments of the present invention, the request process 180 maintains an array of values, corresponding to the array of crypto processors 86, that store the estimated times that each crypto processor 86 will have completed processing all data packets previously provided to that crypto processor 86. The request process 180 also maintains an array of status values used to mark the corresponding array of crypto processors 86 as busy or not busy.

When a request to select the least loaded crypto processor is received by the request process 180, the first crypto processor 86 in the array is checked 182 for a busy status. If the crypto processor 86 is not busy and the estimated completion time value is past the current time 184, indicating that the crypto processor 86 is idle, that crypto processor 86 is immediately selected 186 to process the received data packet. Based on the size of the particular data packet and the identity of the selected crypto processor 86, the corresponding performance table is consulted to determine an estimated time that the selected crypto processor 86 will complete processing of the received data packet. In the preferred embodiments of the present invention, the estimated time is based on a linear interpolation through the vector packet data size values and the size of the current received data packet. While more complex estimation algorithms can be used, such as algorithms using a best-fit curve analysis, linear interpolation based on size is believed to provide a sufficient basis for estimating completion times. The estimated value is then stored 188 in the estimated completion time array and the data packet is dispatched to the selected crypto processor 86.

Where the crypto processor 86 is currently processing data packets 184, as reflected by the estimated time for completion value is greater than the current time, the completion time delta is recorded 190, and any further 192 crypto processors 86 are sequentially checked 194 through the same loop. The loop will break whenever an idle crypto processor 86 is found 184, 186. Otherwise, when completion time deltas for all of the crypto processors 86 have been accumulated 192, the crypto processor 86 represented by the smallest completion time delta is selected 196. The estimated time to process the current received data packet, again as determined from the corresponding performance table, is then added 188 to the existing time to completion value for the selected crypto processor 86. The data packet is then dispatched to the selected crypto processor 86.

The preferred request process 180 also handles the circumstance where a not busy message from a crypto processor 86 may have been dropped by the ingress processor 80 for some reason. Thus, if the status of a crypto processor 86 is busy 182, but the current time is past the estimated time to complete 198 the processing of all data packets previously dispatched to the crypto processor 86, the status of the crypto processor 86 is directly set to not busy 200 and the estimated time to complete value is set to the current time 190. The reset crypto processor 86 is then immediately selected 186 to process the received data packet. Consequently, crypto processors 86 may not be inadvertently lost from participation in the operation of the gateway 72. Conversely, the ingress processor 80 or control processor 84 may monitor the number of times and frequency that any crypto processor 86 fails to report not busy status and, as appropriate, permanently remove the failing crypto processor 86 from consideration by the request process 180.

An alternate load balancing algorithm can be implemented by utilizing the capabilities of the switch fabric 78 to directly pass a busy status signal from the crypto processors 86 readable by the ingress processor 80. FIG. 11 provides a detailed view of the port interfaces 220 of the preferred switch fabric 78. An input port interface 222 includes a serial cell data register 224 that decodes the initial bytes of a provided data cell, which are prefixed to the cell data by any of the connected processors 80, 82, 84, 86, to provide an address for the desired destination output port for the cell data. Input port logic 226 provides a grant signal 228 to indicate the availability of the selected output port to accept the cell data. Since the switch fabric 78 is non-blocking, the grant signal 228 can be immediately returned to the connected processor 80, 82, 84, 86.

The grant signal is generated 228 based on the state of the addressed output port 230. The cell data, which is of fixed length, is automatically transferred by the switch fabric 78 to an output data queue 232 within the output port 230 provided there is available space within the output data queue 232 and the output port 232 has been enabled to receive cell data. Data flow control logic 234 within the output port 230 manages the state of the output data queue 232 based on cell data space available and whether a send grant signal is externally applied by the device connected to the output port 230. The combined resulting output port 230 state information is then available to the processor 80, 82, 84, 86 connected to the input port 222 by way of the grant signal 228.

By monitoring the state of the grant signal 228 with respect to each output port 230 connected to a crypto processor 86, a communications processor 90, specifically an ingress processor 80, can selectively manage the distribution of network data packets to individual crypto processors 86. This management is based on the crypto processors 86 each implementing an input FIFO queue of limited and defined depth for accepting network data packets for encryption or decryption processing. In preferred embodiments of the present invention, this FIFO depth is limited and fixed at two maximum size network data packets. When the FIFO queue of a crypto processor 86 is full, the send grant signal is withdrawn from the corresponding output port of the switch fabric 78.

An ingress processor 80 can read the state of the grant signals of the output port array from control registers maintained by the switch fabric 78. Alternately, the ingress processor 80 can attempt to send an empty data cell to a target addressed output port to directly obtain the grant signal 228 from the output port. In either case, the ingress processor 80 can efficiently check or poll the processing availability state of any and all of the crypto processors 86 without interrupting any current processing being performed by the crypto processors 86. The checking of the processing availability can be performed by an ingress processor 80 periodically or just whenever the ingress processor 80 needs to transfer a network data packet to an available crypto processor 86. Preferably, availability of individual crypto processors 86 is performed on an as needed basis further qualified by predictive selection of the individual crypto processors 86 with the least current load. Such predictive selection can be effectively based on a least-recently-used algorithm combined with quantitative data, such as the size of the network data packets transferred on average or in particular to the different crypto processors 86. Consequently, the ingress processors 80 can implement an effective load balanced distribution of network data packets to the array of crypto processors 86.

In another alternate embodiment of the present invention, multiple ingress processors 80 can be used to pass network data packets to the array of crypto processors 86. The use of multiple ingress processors 80, however, requires cooperative management to prevent collisions in the distribution of network data packets. Since the switch fabric 78 atomically transfers data as data cells, rather than as complete data frames, cooperative management is required to preserve the integrity of network data packets distributed by different ingress processors. In the initially preferred embodiment of the present invention, the array of crypto processors 86 is partitioned into fixed encryption and decryption sub-arrays that are separately utilized by the two ingress processors 80. As an alternative to using fixed size sub-arrays, the control processor 84 may be utilized to monitor the effective load on the sub-arrays, such as by periodically reviewing the statistics collected by the ingress processors 80, and dynamically reallocate the crypto processors 86 that are members of the different sub-arrays. Whenever a significant imbalance in the rate of use of the sub-arrays is identified by the control processor 84, an out-of-band control message is provided by the control processor 84 to each ingress processor 80 defining new sets of sub-arrays to be utilized by the different ingress processors 80.

FIG. 12 provides a flow diagram describing the network packet processing operation 240 of an ingress processor 80 for network data packets received from a clear text network in accordance with a preferred embodiment of the present invention. An ordinary network data packet, as received 242, includes a conventional IP header 244 and data packet payload 246. The IP header is examined 250 to discriminate and filter out 252 data packets that are not to be passed through the VPN gateway 72. For data packets that are to be passed, the routing connection is then identified 254 at least as the basis for identifying the SA parameters that pertain to and control the cryptography protocol processing of the data packet by the VPN gateway 72. Once the route connection is identified, the ingress processor 80 determines 256 whether a corresponding network connection SA context exits. In the preferred embodiments of the present invention, the ingress processor 80 depends on the routing and SA parameter information provided in the data table 102.

Where an applicable connection route or SA parameter context is not found in the data table 102, indicating that the network data packet received corresponds to an implied new connection request, the data packet is forwarded 258 through the control path to the control processor 84 for negotiation of an IPsec connection. The negotiation is conducted through the appropriate network connected ingress and egress processors 80, 82, effectively operating as simple network interfaces, to establish the IPsec connection 260 and mutually determine and authenticate the SA parameters for the connection 262. The control processor 84 then preferably distributes 264 a content update to the data tables 102 of the ingress processors. This content update is preferably distributed to the ingress processors 80 through out-of-band control messages, which enter the connection route and SA parameter context into the data tables 102.

Where a SA context is found 256 in the data table 102 by an ingress processor 80, fast path processing is selected. The relevant SA parameters are retrieved 266 from the SA context store and formatted into a SA header 268. A tunneling IP header 270, IPsec control fields 271, padding field 272, and Message Authentication Code (MAC) field 273 are also created. These fields are then attached 274 to the network data packet. An available crypto processor 86 of the encryption sub-array partition is then selected based on load-balance analysis 276 and the network data packet is dispatched 278.

The operation 280 of a crypto processor 86, operating to encrypt a network data packet, is shown in FIG. 13. The network data packet received 282 by a crypto processor 86 preferably includes the SA header 268, tunneling IP header 270, IPsec control fields 271, padding field 272, and MAC field 273, as well as the original network data packet 244, 246. The crypto processor 86 then adjusts the reportable load balance availability 284 by issuing, as appropriate, a busy message to the ingress processor 80. The network processor 112 of the crypto processor 86 next utilizes the information provided in the SA header 268 to locate 286 the beginning of the IP header 244 and encrypt 288 the header 244, packet data 246 and padding field 272 using the SA header 268 provided parameters. The resulting encrypted network data packet, which then includes the SA header 268, tunneling IP header 270, IPsec fields 271, the encrypted payload 290, and MAC field 273, is then dispatched 292 to the egress processor 82. The selection of an appropriate egress processor 82, where multiple egress processors 82 are present, is determined by the crypto processor 86 from the route identification information contained in the tunneling IP header 270.

When, as shown as the process 300 in FIG. 14, an egress processor 82 receives 302 the encrypted data packet from a crypto processor 86, the SA header 268 is removed 304 from the remaining IPsec compliant encrypted data packet. The resulting data packet 270, 271, 290, 273 is then forwarded 306 on to the external network attached to the egress processor 82.

Figure 15:
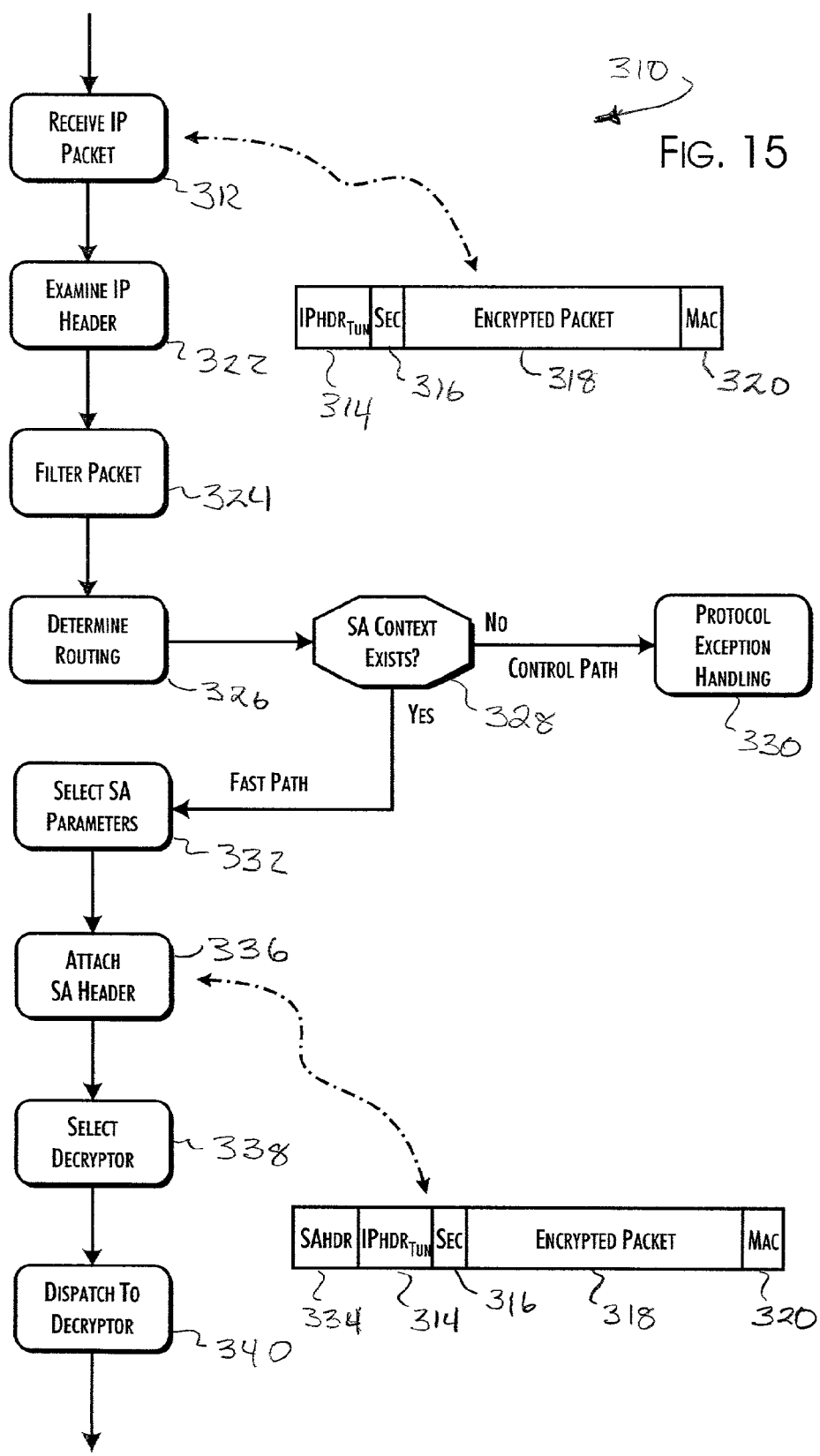
FIG. 15 is a control flow diagram describing the data processing of an input encrypted network data packet by an ingress processor module in accordance with a preferred embodiment of the present invention.

The operational protocol conversion of encrypted network data packets to clear text data packets closely parallels that of the clear text to encrypted conversion operations 240, 280, 300. As shown in the operational flow 310 of FIG. 15, when an ingress processor 80 receives 312 a network data packet containing an IP header 314, IPsec fields 316, encrypted packet 318, and MAC field 320, the IP header 314 is examined 322, the packet is filtered 324, and routing determined 326. The SA context is checked 328 for existence. Since an encrypted data packet should not be received on a connection that has not been previously set up, non-existence of a matching SA context is treated as a protocol exception 330 and passed on to the control processor 84 for handling.

The SA parameters are selected 332 to assemble an SA header 334, which is then attached 336 to the received network data packet. Based on the applied load-balance analysis, a crypto processor 82 within the decryption sub-array is selected 338 and the network data packet is dispatched 340 for decryption processing.

Figures 16, 17:
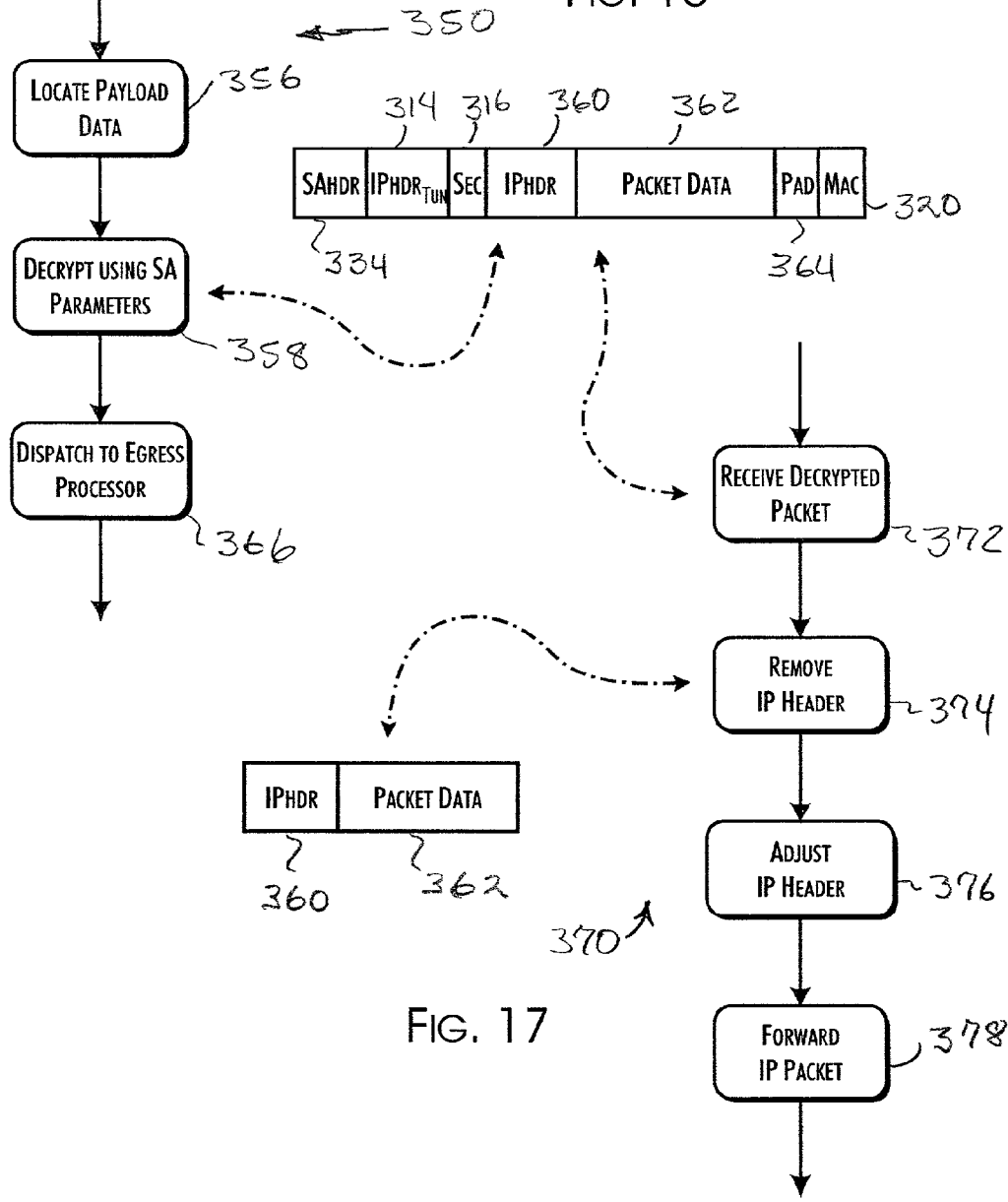
FIG. 16 is a control flow diagram describing the data processing of an encrypted network data packet by a decrypting network packet processor module in accordance with a preferred embodiment of the present invention.
FIG. 17 is a control flow diagram describing the data processing of a decrypted network data packet by an egress processor module in accordance with a preferred embodiment of the present invention.

The decryption processing 350 of a network data packet by a crypto processor 86 is shown in FIG. 16. After the packet is accepted 352, the busy status of the crypto processor 86 is reported 354 to the ingress processor 80, as appropriate. The SA header 334 and tunneling IP header 314 are then examined 356 to identify the beginning and length of the encrypted packet 318. The encrypted packet 318 is then decrypted 358 utilizing the SA parameters provided by the SA header 334. This recovers the encrypted IP header 360, packet data 362, and padding field 364. An egress route is then determined from the decrypted IP header 360. The resulting conventional network data packet is then dispatched 366 to the determined egress processor 82.

The decrypted network data packet is finally processed 370 by an egress processor 82, as shown in FIG. 17. Once received 372, the SA header 334, tunneling IP header 218, IPsec fields 316, padding field 364, and MAC field 320 are removed 374. The information contained in the decrypted IP header 360 is then updated 376, such as to reflect a correct hop count and similar status data. The resulting conventional network data packet is then forwarded 378 by the egress processor 82 onto the attached external network.

Thus, a system and methods for providing a scalable network gateway processor optimally implementing wire-speed compute intensive processing operations on network data packets through the use of an efficient internal load balancing system has been described. While the present invention has been described particularly with reference to the implementation of a virtual private network gateway device, the present invention is equally applicable to efficiently utilizing a scalable array of protocol processors in performing any compute intensive network protocol processing operations that are advantageously performed at wire speeds.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A scalable network gateway processor architecture comprising:
   a) a scalable array of compute processors implementing a protocol processing function to convert inbound data packets to outbound data packets;
   b) an ingress processor coupleable to a first network to receive said inbound data packets and coupled to provide said inbound data packets to said scalable array of compute processors, said ingress processor distributing said inbound data packets to said scalable array of compute processors based on a least load value selected from current load values determined for the respective compute processors of said scalable array of compute processors; and
   c) an egress processor coupleable to a second network and coupled to said scalable array of compute processors to collect outbound data packets from said scalable array of compute processors and send said outbound data packets to said second network, wherein said current load values represent estimated processing completion times for the respective compute processors of said scalable array of compute processors, wherein said current load values are of said inbound data packets to outbound data packets from said ingress processor to said egress processor through said scalable array of compute processors, wherein said ingress processor updates a predetermined one of said current load values on distribution of a predetermined data packet based on the size of said predetermined data packet and the performance data accumulated with respect to a distribution corresponding one of said scalable array of compute processors, and wherein the update of said predetermined one of said current load values is based on an interpolation of the performance data accumulated with respect to a distribution corresponding one of said scalable array of compute processors.

2. A method of dynamically load balancing the distribution of network data packets to plural computer processors within a scalable network gateway processor, said method comprising the steps of:
- a) developing performance data representing the time to process data packets by an array of packet processors, said performance data being developed with respect to the packet processors of said array of packet processors based on multiple data packet sizes and the unique round trip routes of data packets from ingress to egress with respect to said scalable network gateway processor through said array of packet processors;
- b) accumulating, with respect to the packet processors of said array of packet processors, load values representing the completion times of data packets pending processing by said array of packet processors, said completion times being estimated based on said performance data;
- c) distributing data packets to said array of packet processors determined by respective selection of a minimum one of said load values; and
- d) updating the completion times of data packets pending processing by said array of packet processors upon distribution of data packets to said array of packet processors, wherein the completion times are changed based on said performance data and the size of the data packets distributed, and wherein the respective load values are updated based on an interpolation of the performance data accumulated with respect to said array of packet processors.

3. A scalable processor system supporting dynamic internal load balanced processing of network data packets transferred through said system, said scalable processor system comprising:
- a) a plurality of compute processors wherein each compute processor implements a data packet processing function to convert first data packets to second data packets;
- b) an ingress processor coupleable to a first network to receive inbound data packets and coupled to said plurality of compute processors to selectively distribute first data packets to said plurality of compute processors such that each said first data packet is distributed to a respective compute processor determined by said ingress processor to have a current minimum processing load relative to said plurality of compute processors, said current minimum processing load reflecting the respective processing performance of said plurality of compute processors and the size of first data packets respectively pending processing by said plurality of compute processors; and
- c) an egress processor coupled to said plurality of compute processors to receive said second data packets from said plurality of compute processors, said egress processor being coupleable to a second network to provide outbound data packets to said second network, said scalable processor system maintaining current load values of each said computer processor based on estimated processing completion times for the respective compute processors of said scalable array of compute processors, wherein said current load values are dynamically derived based on performance data accumulated representing each unique round trip route of said inbound data packets to outbound data packets from said ingress processor to said egress processor through said scalable array of compute processors, and wherein the dynamic derivation of said current load values are based on an interpolation of the performance data accumulated with respect to a distribution corresponding one of said plurality of compute processors.

4. The scalable processor system of claim 3 wherein said ingress processor includes performance data reflecting the respective processing performance of said plurality of compute processors for data packets in a predetermined series of sizes.

5. The scalable processor system of claim 4 wherein said ingress processor stores estimated completion times respectively for said plurality of compute processors, wherein said estimated completion times are based on said performance data and the aggregate size of said first data packets distributed respectively to said plurality of compute processors.

6. The scalable processor system of claim 5 wherein said ingress processor determines said current minimum processing load as the minimum delta between a current time and said estimated completion times.

7. The scalable processor system of claim 6 wherein said ingress processor dynamically develops said performance data.

8. The scalable processor system of claim 7 wherein said ingress processor immediately determines to distribute a predetermined first data packet to a predetermined compute processor of said plurality of compute processors where the delta between said current time and said estimated completion time for said predetermined compute processor is less than or equal to zero.

9. The scalable processor system of claim 5 wherein said ingress processor is responsive to busy messages received from said plurality of compute processors and wherein said estimated completion times are further based on said busy messages as received respectively from said plurality of compute processors.

10. The scalable processor system of claim 9 wherein said ingress processor determines said current minimum processing load as the minimum delta between a current time and said estimated completion times.

11. The scalable processor system of claim 10 wherein said ingress processor dynamically develops said performance data.

* * * * *